(12) United States Patent
Kim

(10) Patent No.: US 12,354,017 B2
(45) Date of Patent: Jul. 8, 2025

(54) ALIGNING KNOWLEDGE GRAPHS USING SUBGRAPH TYPING

(71) Applicant: Robert Bosch GmbH, Stuttgart (DE)

(72) Inventor: HyeongSik Kim, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 1163 days.

(21) Appl. No.: 17/191,518

(22) Filed: Mar. 3, 2021

(65) Prior Publication Data

US 2022/0284309 A1 Sep. 8, 2022

(51) Int. Cl.
*G06N 5/02* (2023.01)
*G06F 18/20* (2023.01)
(Continued)

(52) U.S. Cl.
CPC ............. *G06N 5/02* (2013.01); *G06F 18/214* (2023.01); *G06F 18/22* (2023.01); *G06F 18/25* (2023.01);
(Continued)

(58) Field of Classification Search
CPC .......... G06N 5/02; G06N 20/00; G06N 5/022; G06F 18/214; G06F 18/22; G06F 18/25; G06F 18/29; G06F 18/295
See application file for complete search history.

(56) References Cited

U.S. PATENT DOCUMENTS 8,620,931 B2 12/2013 Zillner
8,738,636 B2 5/2014 Jean-Mary et al.
(Continued)

FOREIGN PATENT DOCUMENTS

CN 106202543 A 12/2016
CN 106777218 A 5/2017
(Continued)

OTHER PUBLICATIONS

Wu, Yinghui, Shengqi Yang, and Xifeng Yan. "Ontology-based subgraph querying." 2013 IEEE 29th International Conference on Data Engineering (ICDE). IEEE, 2013. (Year: 2013).*
(Continued)

*Primary Examiner* — Michelle T Bechtold
*Assistant Examiner* — Nicholas S Wu
(74) *Attorney, Agent, or Firm* — Michael Best & Friedrich LLP

(57) ABSTRACT

Systems and methods for aligning knowledge graphs. A subgraph type is assigned to each node of a plurality of nodes in a first knowledge graph and a second knowledge graph. The assigned subgraph type for each node is determined based on the labels of a plurality of edges and/or other nodes coupled to the node in the knowledge graph. An initial matching is performed to identify a plurality of candidate node-node pairs each including one node from each knowledge graph. A candidate node-node pair is identified as a valid node-node mapping based at least in part on a determination that the subgraph type combination of the candidate node-node pair matches a subgraph type combination of another candidate node-node pair that has previously been confirmed as a valid node-node mapping. In some implementations, a machine-learning model is trained to use the aligned knowledge graphs.

18 Claims, 12 Drawing Sheets

(51) Int. Cl.
  *G06F 18/214*  (2023.01)
  *G06F 18/22*   (2023.01)
  *G06F 18/25*   (2023.01)
  *G06N 5/022*   (2023.01)
  *G06N 20/00*   (2019.01)

(52) U.S. Cl.
  CPC ............ *G06F 18/29* (2023.01); *G06N 20/00* (2019.01); *G06F 18/295* (2023.01); *G06N 5/022* (2013.01)

(56) References Cited

U.S. PATENT DOCUMENTS

| | | | |
|---|---|---|---|
| 9,747,563 | B2 | 8/2017 | Lee et al. |
| 10,019,516 | B2 | 7/2018 | Zhang et al. |
| 10,210,246 | B2 | 2/2019 | Stojanovic et al. |
| 2009/0077094 | A1 | 3/2009 | Bodain |
| 2010/0185700 | A1 | 7/2010 | Bodain |
| 2012/0078595 | A1 | 3/2012 | Balandin et al. |
| 2017/0132329 | A1* | 5/2017 | Yakout ............... G06F 16/9024 |
| 2017/0185674 | A1 | 6/2017 | Tonkin et al. |
| 2019/0361937 | A1* | 11/2019 | Rogynskyy ............ G06F 16/28 |
| 2020/0242444 | A1* | 7/2020 | Zhang .................. G06F 16/367 |
| 2021/0109995 | A1* | 4/2021 | Mihindukulasooriya .................... G06F 40/247 |
| 2022/0222543 | A1* | 7/2022 | Khatibi ................ G06F 16/285 |

FOREIGN PATENT DOCUMENTS

| | | |
|---|---|---|
| CN | 107798146 A | 3/2018 |
| KR | 101542605 B1 | 8/2015 |

OTHER PUBLICATIONS

Wu, Yuting, et al. "Neighborhood matching network for entity alignment." arXiv preprint arXiv:2005.05607 (2020). (Year: 2020).*
Wan, Guojia, et al. "Adaptive knowledge subgraph ensemble for robust and trustworthy knowledge graph completion." World Wide Web 23 (2020): 471-490. (Year: 2020).*
Sun, Zequn, et al. "Knowledge graph alignment network with gated multi-hop neighborhood aggregation." Proceedings of the AAAI conference on artificial intelligence. vol. 34. No. 01. 2020. (Year: 2020).*
Pershina et al., "Holistic Entity Matching Across Knowledge Graphs", IEEE International Conference on Big Data, 2015, pp. 1585-1590.
Volz et al., "Discovering and Maintaining Links on the Web of Data", International Semantic Web Conference, 2009, op. 650-665.
Raimond et al., "Automatic Interlinking of Music Datasets on the Semantic Web", LDOW, 2008, 8 pages.
Neumann et al., "Characteristic Sets: Accurate Cardinality Estimation for RDF Queries with Multiple Joins", ICDE Conference, 2011, pp. 984-994.
Kim et al., "Type-based Semantic Optimization for Scalable RDF Graph Pattern Matching", International Word Wide Web Conference Committe, 2017, pp. 785-794.
Trisedya et al., "Entity Alignment between Knowledge Graphs Using Attribute Embeddings", The Thirty-Third AAAI Conference on Artificial Intelligence, 2019, pp. 297-304.
Bordes eta l., "Learning Structured Embeddings of Knowledged Bases", Proceedings of the Twenty-Fifth AAAI Conference on Artificial Intelligence, pp. 301-306.
Semantic Web Standards, Ontology Language (OWL), <https://www.w3.org/OWL/>, published Dec. 11, 2012, 3 pages.
Semantic Web Standards, Resource Description Framework (RDF), <https://www.w3.org/RDF/>, published Feb. 25, 2014, 3 pages.
RDF, RDF Schema 1.1, <https://www.w3.org/TR/rdf-schema/>, published Feb. 25, 2014, 15 pages.

* cited by examiner

| Node | Node | Confidence |
|---|---|---|
| geoLoc102 | Q8684 | 1 |
| geoLoc101 | Q172157 | 0.5 |
| geoLoc101 | Q37516702 | 0.5 |
| geoLoc101 | Q28968028 | 0.5 |
| ... | | |

*FIG. 9A*

| Node | Type | Timestamp |
|---|---|---|
| geoLoc102 | {geoNames ID, coordinated location, ...} | 2020-11-12T18:17:22+00:00 |
| geoLoc101 | {geoNames ID, coordinated location, ...} | 2020-11-12T18:17:24+00:00 |
| Q8684 | {country, capital of, ...} | 2020-11-12T18:17:23+00:00 |
| Q172157 | {country, capital of, ...} | 2020-11-12T18:17:25+00:00 |
| Q37516702 | {genre, country of origin, ...} | 2020-11-12T18:17:26+00:00 |
| Q28968028 | {instance of, rdfs:label} | 2020-11-12T18:17:27+00:00 |
| ... | | |

*FIG. 9B*

| Type | Timestamp | Statistics |
|---|---|---|
| {country, capital of, ...} | 2020-11-12T18:18:00+00:00 | {count: 1, ...} |
| ... | | |

*FIG. 9C*

| Node | Node | Confidence |
|---|---|---|
| geoLoc102 | Q8684 | 1 |
| geoLoc101 | Q172157 | 0.9 |
| geoLoc101 | Q37516702 | 0.1 |
| geoLoc101 | Q28968028 | 0.1 |
| ... | | |

FIG. 10A

| Node | Type | Timestamp |
|---|---|---|
| geoLoc102 | {geoNames ID, coordinated location, ...} | 2020-11-12T18:17:22+00:00 |
| geoLoc101 | {geoNames ID, coordinated location, ...} | 2020-11-12T18:17:24+00:00 |
| Q8684 | {country, capital of, ...} | 2020-11-12T18:17:23+00:00 |
| Q172157 | {country, capital of, ...} | 2020-11-12T18:17:25+00:00 |
| Q37516702 | {genre, country of origin, ...} | 2020-11-12T18:17:26+00:00 |
| Q28968028 | {instance of, rdfs:label} | 2020-11-12T18:17:27+00:00 |
| ... | | |

FIG. 10B

| Type | Timestamp | Statistics |
|---|---|---|
| {country, capital of, ...} | 2020-11-12T18:18:00+00:00 | {count: 2, ...} |
| ... | | |

FIG. 10C

| Node | Node | Confidence |
|---|---|---|
| geoLoc102 | Q8684 | 1 |
| geoLoc101 | Q172157 | 0.9 |
| ... | | |

*FIG. 11A*

| Node | Type | Timestamp |
|---|---|---|
| geoLoc102 | {geoNames ID, coordinated location, ...} | 2020-11-12T18:17:22+00:00 |
| geoLoc101 | {geoNames ID, coordinated location, ...} | 2020-11-12T18:17:24+00:00 |
| Q8684 | {country, capital of, ...} | 2020-11-12T18:17:23+00:00 |
| Q172157 | {country, capital of, ...} | 2020-11-12T18:17:25+00:00 |
| Q37516702 | {genre, country of origin, ...} | 2020-11-12T18:17:26+00:00 |
| Q28968028 | {instance of, rdfs:label} | 2020-11-12T18:17:27+00:00 |
| ... | | |

*FIG. 11B*

| Type | Timestamp | Statistics |
|---|---|---|
| {country, capital of, ...} {geoNames ID, coordinated location, ...} | 2020-11-12T18:18:00+00:00 | {count: 2, ...} |
| ... | | |

*FIG. 11C*

ALIGNING KNOWLEDGE GRAPHS USING SUBGRAPH TYPING

BACKGROUND

The present invention relates to systems and methods for combining data from multiple different knowledge graphs for use in machine-learning systems.

SUMMARY

A knowledge graph (or KG) is a collection of machine-readable descriptions of interlinked entities including, for example, real-world objects, events, situations, etc. Machine-learning and artificial intelligence systems may be designed or trained to use KGs for backgrounds knowledge and, thereby, enabling a more accurate interpretation of text and speech data. Due to practical limitations, KGs are often constructed to support only domain-specific applications and are designed & constructed according to a framework defined by experts in that domain. However, in some implementations, it may be advantageous to utilize a KG that more comprehensively covers an entire domain of interest or multiple domains. Accordingly, in some implementations, the systems and methods described herein provide mechanisms for aligning and enriching multiple different KGs by identifying and linking correspondences among entities in each separate KG. In some implementations, the systems and methods described herein utilize a mechanism of subgraph typing to facilitate alignment and enrichment of KGs. A subgraph type is a synthetic category or class constructed using a summary of nodes and the nearby edges to capture a characterization of the structures and semantics of the entities in a KG. The systems and methods described herein create subgraph types for all the nodes in a KG representing entities and then effectively utilizes the subgraph types to handle corner cases that arise during the enrichment process, such as disambiguating mappings between entities labeled with polysemous terms.

In one embodiment, the invention provides a computer-based method for aligning knowledge graphs. A subgraph type is assigned to each node of a plurality of nodes in a first knowledge graph and a second knowledge graph. The assigned subgraph type for each node is determined based on the labels of a plurality of edges and/or other nodes coupled to the node in the knowledge graph. An initial matching is performed to identify a plurality of candidate node-node pairs each including one node from each knowledge graph. A candidate node-node pair is identified as a valid node-node mapping based at least in part on a determination that the subgraph type combination of the candidate node-node pair matches a subgraph type combination of another candidate node-node pair that has previously been confirmed as a valid node-node mapping.

In another embodiment, the invention provides a method of training a machine-learning model including aligning at least two knowledge graphs using the subgraph type alignment mechanism and then training the machine-learning model to use the aligned knowledge graph. In some such embodiments, the machine-learning model is trained to receive as input a natural language inquiry and to produce as output a natural language response, wherein the natural language response is determined using the aligned knowledge graphs.

In still another embodiment, the invention provides a system for natural language inquiry processing. The system includes an input device (e.g., a microphone or a keyboard), an output device (e.g., a speaker or a display screen), and a controller. The controller is configured to receive a natural language inquiry through the input device and provide the natural language inquiry as input to a machine-learning model trained to use knowledge graphs aligned using the subgraph type alignment mechanism. The controller then generates an output through the output device, wherein the output includes a response to the natural language query and is generated based on the output of the machine-learning model.

Other aspects of the invention will become apparent by consideration of the detailed description and accompanying drawings.

BRIEF DESCRIPTION OF THE DRAWINGS

FIG. 9A is a table showing a node-node index after the initial alignment step in an example of the alignment method of FIGS. 6 through 8.

FIG. 9B is a table showing a node-type index after the initial alignment step in the example of the alignment method of FIGS. 6 through 8.

FIG. 9C is a table showing a type-type index after the initial alignment step in the example of the alignment method of FIGS. 6 through 8.

FIG. 10A is a table showing the node-node index of FIG. 9A after the enrichment step in the example of the alignment method of FIGS. 6 through 8.

FIG. 10B is a table showing the node-type index of FIG. 9B after the enrichment step in the example of the alignment method of FIGS. 6 through 8.

FIG. 10C is a table showing the type-type index of FIG. 9C after the enrichment step in the example of the alignment method of FIGS. 6 through 8.

FIG. 11A is a table showing the node-node index of FIG. 9A after completion of the alignment method of FIGS. 6 through 8.

FIG. 11B is a table showing the node-type index of FIG. 9B after completion of the alignment method of FIGS. 6 through 8.

FIG. 11C is a table showing the type-type index of FIG. 9C after completion of the alignment method of FIGS. 6 through 8.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
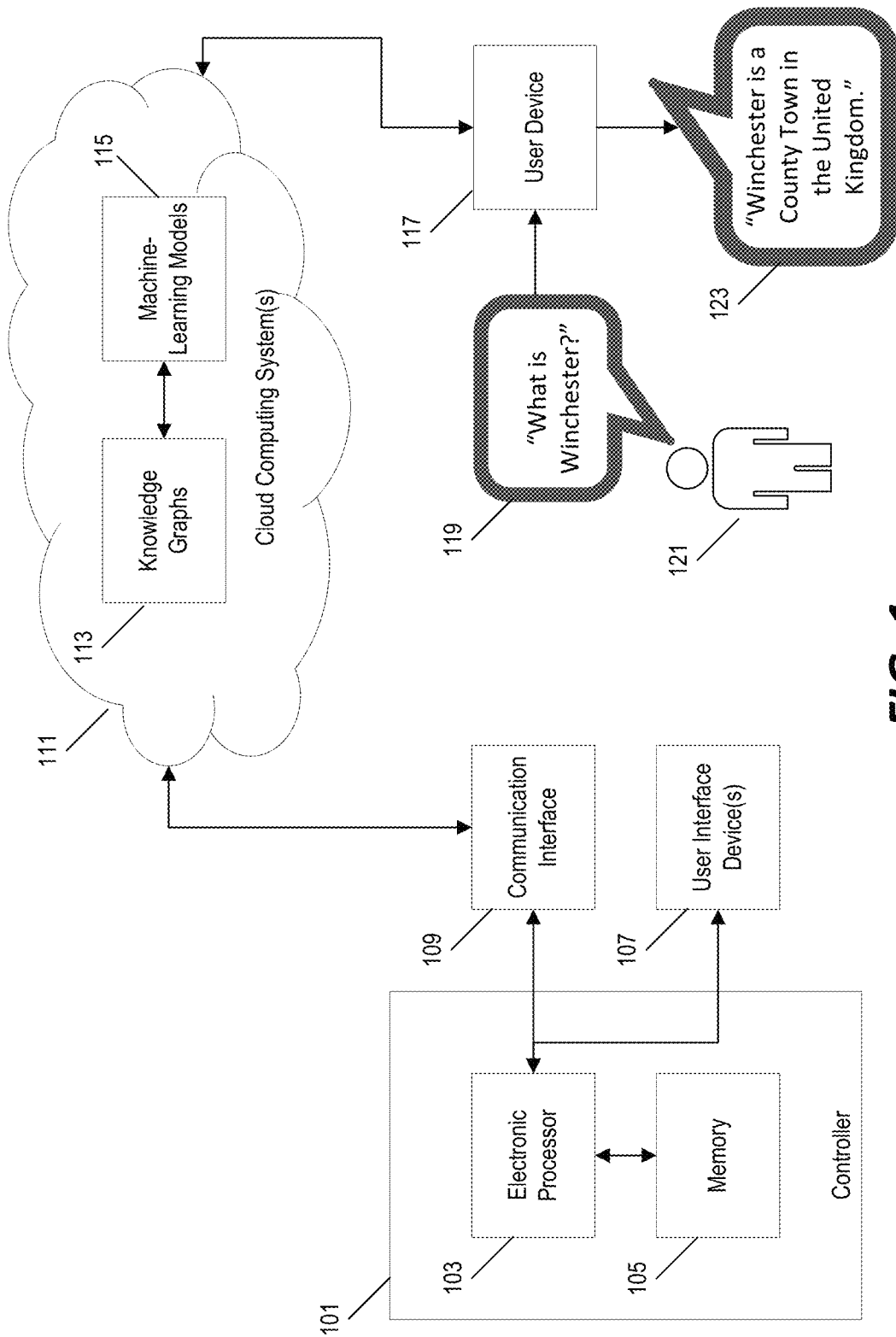
FIG. 1 is a block diagram of a system for aligning knowledge graphs and for user devices configured to apply machine-learning models configured to utilize the aligned knowledge graphs.

FIG. 1 illustrates an example of a system for updating and modifying knowledge graphs & machine-learning models and for using knowledge graphs & machine-learning models. A computer-based system with a controller 101 includes an electronic processor 103 and a non-transitory computer-readable memory 105. The controller 101 is communicatively coupled to one or more user interface devices 107 including, for example, a display screen, a keyboard, a mouse, and/or a touch-sensitive display. The controller 101 is also communicatively coupled to a communication interface device 109 to facilitate communication between the controller 101 and other computer-based systems and networks. In the example of FIG. 1, the controller 101 is configured to communicate with one or more cloud computing systems 111 to access knowledge graphs 113 and/or machine-learning models 115 stored on the cloud computing systems 111. As described in further detail below, the controller 101 in some specific implementations is configured to download one or more knowledge graphs 113 from the cloud computing systems 113, combine the data of the knowledge graphs 113 through a process of alignment and enrichment, and upload the aligned knowledge graph back to the cloud computing systems 111 to be used by other systems and devices. In some implementations, the controller 101 may be configured to download multiple knowledge graphs 113 from the cloud computing system(s) 111 while, in other implementations, the controller 101 may be configured to combine a knowledge graph 113 downloaded from the cloud computing system(s) 111 with another locally-stored knowledge graph (e.g., stored on memory 105).

In addition to computer-based systems, such as controller 101, which are configured to download and modify knowledge graphs 113 and machine-learning models 115 from the cloud computing system(s) 111, other computer-based devices are configured to communicate with the cloud computing system(s) 111 in order to use the machine-learning models 115 and knowledge graphs 113 stored on the cloud computing system(s) 111. For example, as shown in FIG. 1, a user device 117 may be configured to communicatively interface with the cloud computing system(s) 111 to use a machine-learning model 115 and a knowledge graph 113 to provide natural language processing functionality. In the example of FIG. 1, the user device 117 is configured to receive a natural language inquiry 119 as input from a user 121, to process the natural language inquiry 119 using one or more machine learning models 115 on the cloud computing system(s) 111, and to produce a natural language response 123 as output. For example, the natural language inquiry 119 may be received as input through a microphone of the user device 117 and the natural language response 123 may be provided as output through a speaker of the user device 123. The machine learning model 115 may be configured to utilize one or more knowledge graphs 113 stored on the cloud computing system(s) 111 in order to process the natural language inquiry 119 input and to produce a natural language output 123.

A knowledge graph (KG) is a collection of machine-readable descriptions of interlinked entities including, for example, real-world objects, events, situations, or concepts. Many AI-based applications, such as the example illustrated in FIG. 1, rely on knowledge graphs to provide background knowledge and concept & entity awareness to enable a more accurate interpretation of text and speech data (such as the natural language inquiry 119 in the example of FIG. 1). Knowledge graphs can be expressed using graphs with nodes connected by labeled and directed edges. Each node expresses an entity and each labeled & directed edge represents a relationship among the entities.

Figure 2A:
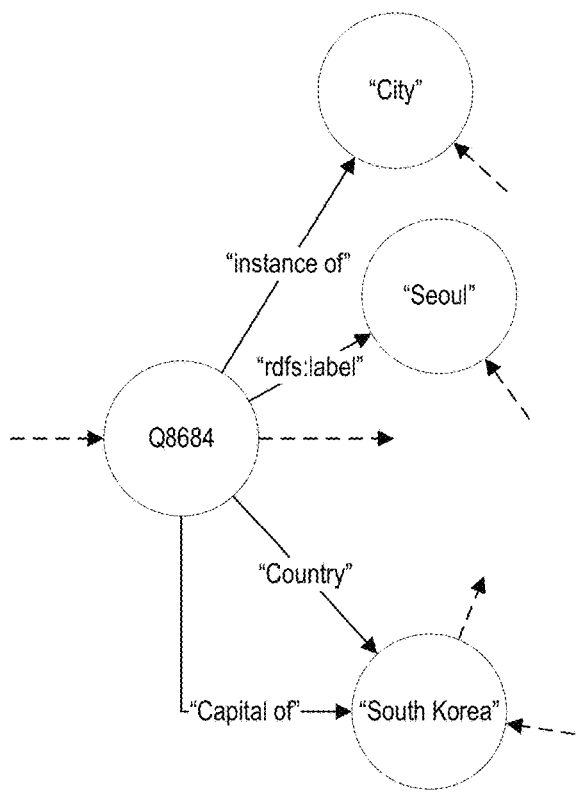
FIGS. 2A, 2B, 2C, and 2D are schematic diagram of portions of a first knowledge graph defining characteristics of various entities.

For example, FIG. 2A illustrates a node "Q8684" that represents the city of Seoul, South Korea. The node "Q8684" is coupled to another node labeled "Seoul" by an edge labeled "rdfs:label." This signifies that "Seoul" is the label/name associated with node "Q8684." Node Q8684 is also coupled to a node "City" by an edge labeled "instance of" indicating that node "Q8684" is a "city" named "Seoul." Node "Q8684" is also coupled to a node "South Korea" by edges labeled "Country" and "Capital Of." Taken together, this collection of nodes and edges indicates that node "Q8684" represents the city of Seoul, South Korea, which is the capital of South Korea. Accordingly, a machine learning model might be trained to use the knowledge graph in the example of FIG. 2A to respond to a natural language inquiry such as "What is the Capital of South Korea?" by finding the node labeled "South Korea" and then following the edge labeled "Capital of" back to node "Q8684."

In practice, knowledge graphs are often represented using standard formats such as "RDF" ("Resource Description Framework"). The examples illustrated in FIGS. 2A through 2D each illustrate a portion of a knowledge graph from Wikidata. The dotted lines in these examples indicate that each node is also linked to other nodes beyond those shown in the illustrated these examples.

Figure 2B:
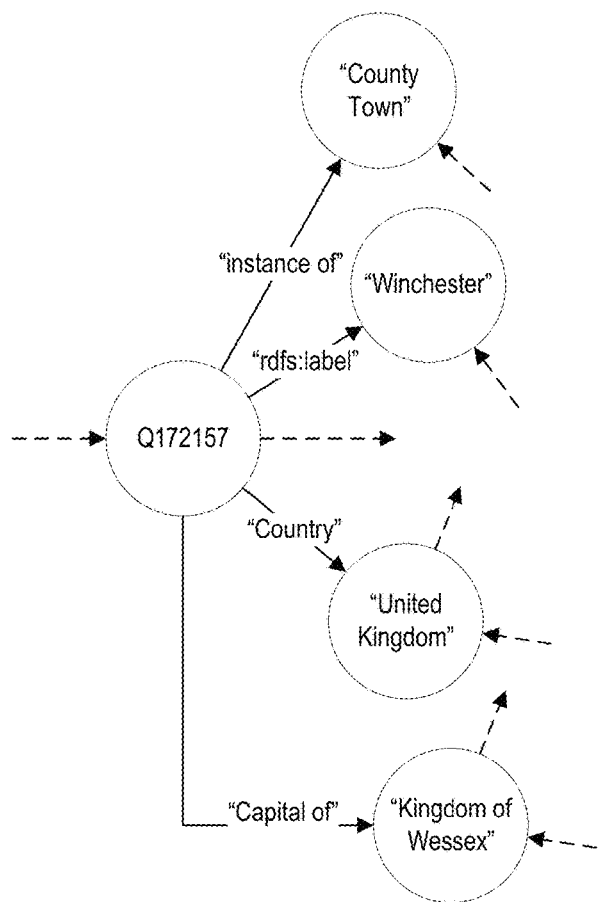
Figure 3A:
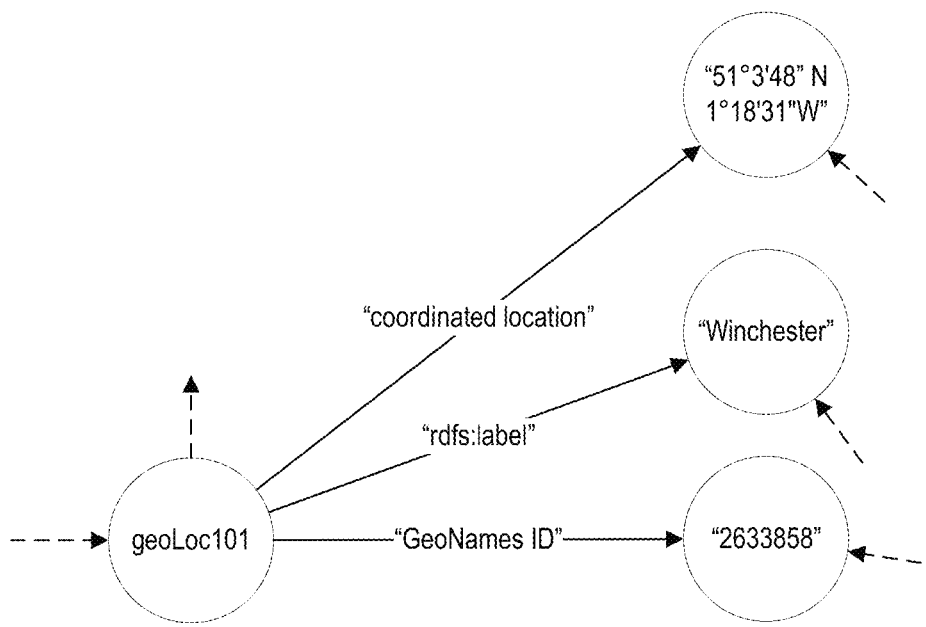
FIGS. 3A and 3B are schematic diagrams of portions of a second knowledge graph defining characteristics of various entities.
Figure 3B:
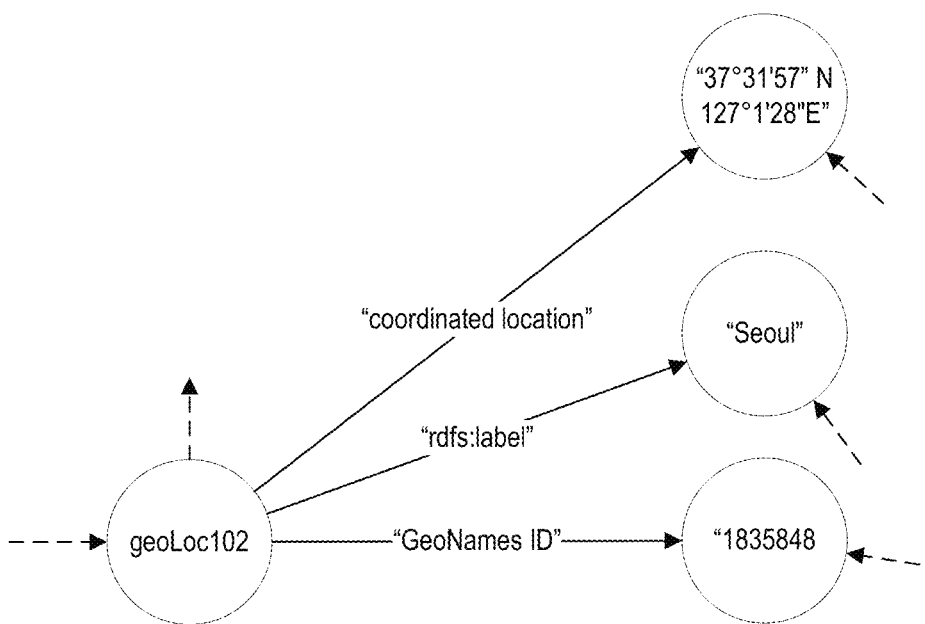

Different knowledge graphs may be developed independently by different groups of domain experts and users based on their own needs (e.g., the design and content of the knowledge graph may be designed to suit the needs of a particular machine-learning model or the application-specific purpose for which the machine-learning model and knowledge graph will ultimately be used). For this reason, each knowledge graph may be described using its own data vocabularies. In order to interoperate these heterogeneous knowledge graphs, equivalent classes of data must be interlinked and aligned. For example, FIGS. 3A and 3B illustrate portions of another example of a knowledge graph. As shown in the example of FIGS. 2A and 2B, the first knowledge graph includes nodes described the cities of Seoul, South Korea and Winchester, UK. As shown in the example of FIGS. 3A and 3B, the second knowledge graph also has nodes describing these two cities, but the second knowledge graph is designed to provide geographic data including GPS coordinates and geolink IDs. These two separate knowledge graphs can be interlinked with each other to provide more complete information on these cities by linking nodes "Q8684" (FIG. 2A) and "Q172157" (FIG. 2B) in the first knowledge graph with nodes "geoLoc102" (FIG. 3B) and "geoLoc101" (FIG. 3A), respectively, in the second knowledge graph.

Figure 2C:
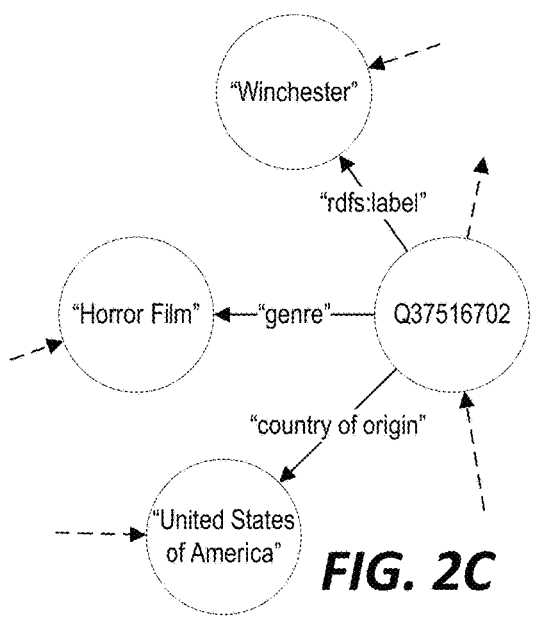
Figure 2D:
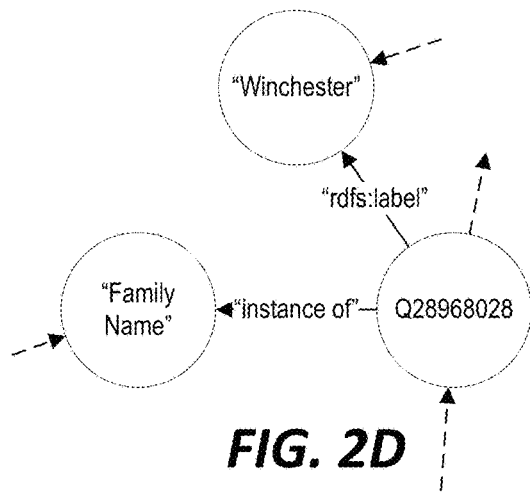

However, because an individual knowledge graph may include billions of nodes, it is not possible to perform this linking manually. However, automated matching is also complicated by the terminology and nomenclature used in different knowledge graphs. For example, an automated matching algorithm might utilize string matching techniques to compare labels of nodes to find matches nodes in the other knowledge graph under the assumption that, if the labels of the nodes are identical or similar, then it is likely that such nodes describe identical entities. However, it is possible for different nodes in the same knowledge graph to be associated with the same label. For example, while node "Q172157" in FIG. 2B is associated with the label "Winchester" so are nodes "Q37516702" (FIG. 2C) and "Q28968028" (FIG. 2D). Therefore, string matching techniques alone are unable to determine which of these three nodes from the first knowledge graph is semantically equivalent to node "geoLoc101" (FIG. 3A) in the second knowledge graph.

Although some knowledge graphs are designed to indicate a "type" for certain entity nodes, such labels are usually not consistent enough for effective automated alignment. For example, in the example of FIGS. 2A through 2D, three of the entity nodes (Q8684 in FIG. 2A, Q172157 in FIG. 2B, and Q28968028 in FIG. 2D) are associated with a "type" node by an edge labeled "instance of." However, entity node Q37516702 in the same first knowledge graph is not associated with any "type" node. Furthermore, as illustrated in the examples of FIGS. 3A and 3B, the second knowledge graph does not use any "type" labeling. Finally, even in situations where explicit "type" labels are used in a knowledge graph, automated matching for alignment can be complicated by inconsistent nomenclature in the labelling process. For example, node Q8684 is defined as an "instance of" "City" while Q172157 is defined as an "instance of" a "Country Town." Therefore, automated systems that perform matching based on explicit "type" labeling included in the knowledge graph may determine that these nodes are different "types."

A solution to this problem is a mechanism referred to herein as "subgraph typing" in which a synthetic type is induced and assigned to a node in a knowledge graph. Each subgraph type is defined by a set or a category of items (e.g., nodes in the knowledge graph) that share some properties or attributes in common and that can be differentiated from other items by these shared properties or attributes. Once a proper subgraph type can be assigned that can well-characterize a target node and further allow all the nodes in each knowledge graph to have such a subgraph type, then alignment of the knowledge graphs can be performed utilizing such subgraph types to determine which nodes should be selected as a "matching" node when multiple matching candidate nodes are found during the alignment process.

In some of the examples described herein, subgraph typing induces and creates a new type definition from the meta-data of a "subgraph" including the target node. A "subgraph" is a part of a knowledge graph that describes a node using other nodes and "edges" connecting the nodes. For example, FIG. 2A illustrates a "subgraph" defining node Q8684. FIGS. 2B, 2C, 2D, 3A, and 3B also each illustrate an example of a subgraph. One strategy for defining a subgraph type is to define that the "subgraph type" of a node is the combination of the labels of edges nearby (e.g., all the edges within the distance of one "hop" from the target node). In the examples below, a subgraph type is denoted as T and the edge labels defining the subgraph type are denoted as its subscript. For example, the subgraph type of node Q8684 in FIG. 2A would be denoted as $\tau_{(country,\ capital\ of,\ instance\ of,\ rdfs:label)}$ because the edge labels within one-hop of node Q8684 are "country," "Capital of," "instance of," and "rdfs:label." For simplification, in some of the examples described herein, a subgraph type is denoted listing only the first two properties in the subscript of the subtype notation (e.g., $\tau_{(country,\ capital\ of,\ \ldots)}$ as the subgraph type of node Q8684).

Using this same subgraph type labeling convention, the same subgraph type (i.e., $\tau_{(country,\ capital\ of,\ \ldots)}$) is assigned to node Q172157 of FIG. 2B because the edge labels within one hop of node Q172157 are the same as the edge labels within one hop of node Q8684. Node Q37516702 of FIG. 2C is assigned subgraph type $\tau_{(genre,\ country\ of\ origin,\ \ldots)}$ and Node Q28968028 of FIG. 2D is assigned subgraph type $\tau_{(instance\ of,\ rdfs:label)}$. By applying this same subgraph type labeling convention to the second knowledge graph, Node geoLoc101 of FIG. 3A and Node geoLoc102 of FIG. 2B are both assigned subgraph type $\tau_{(geoNames\ ID,\ coordinated\ location,\ \ldots)}$.

Figure 4A:
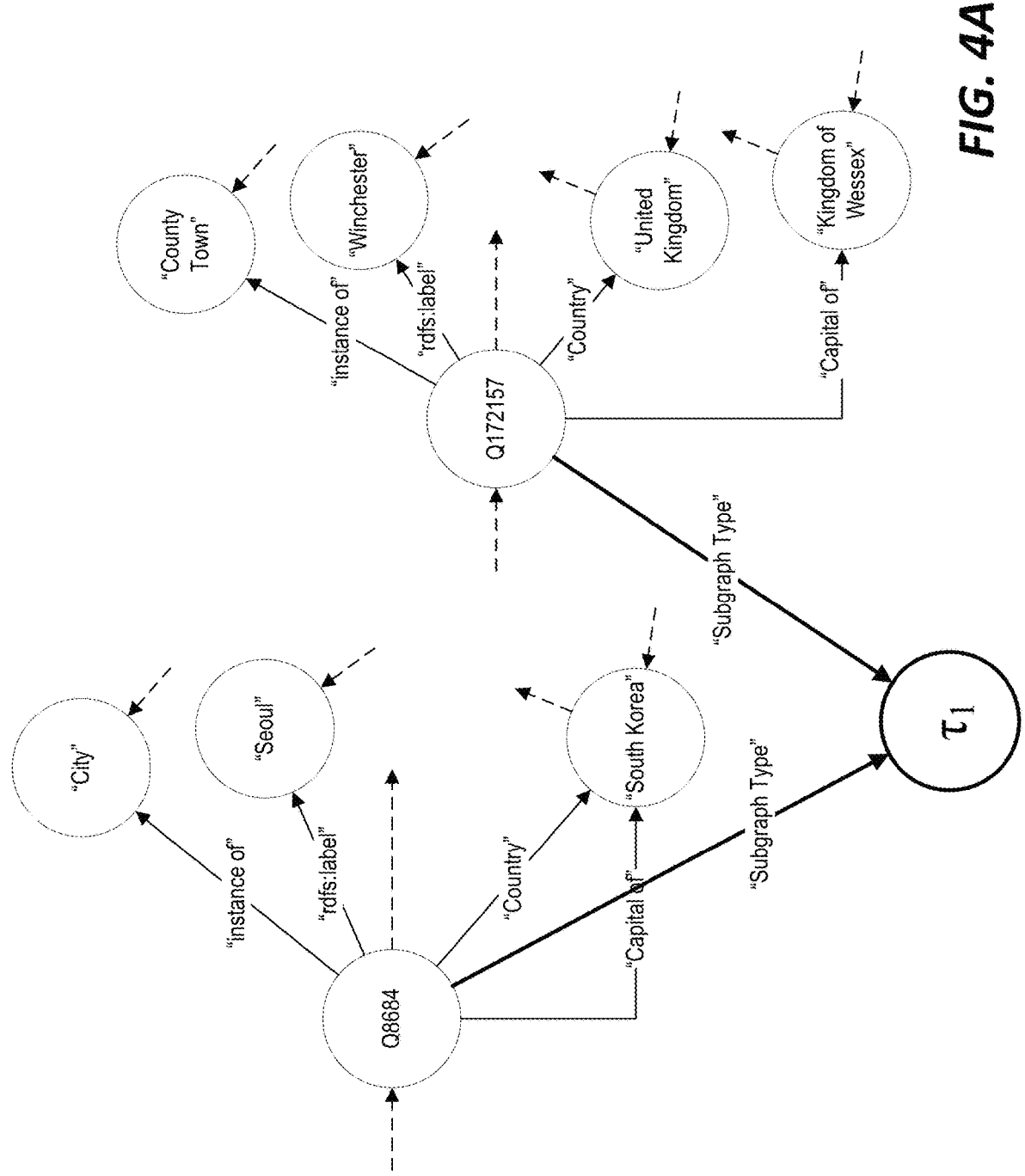
FIGS. 4A and 4B are schematic diagrams of the portions of the first knowledge graph of FIGS. 2A, 2B, 2C, and 2D modified to include an indication of subgraph type.
Figure 4B:
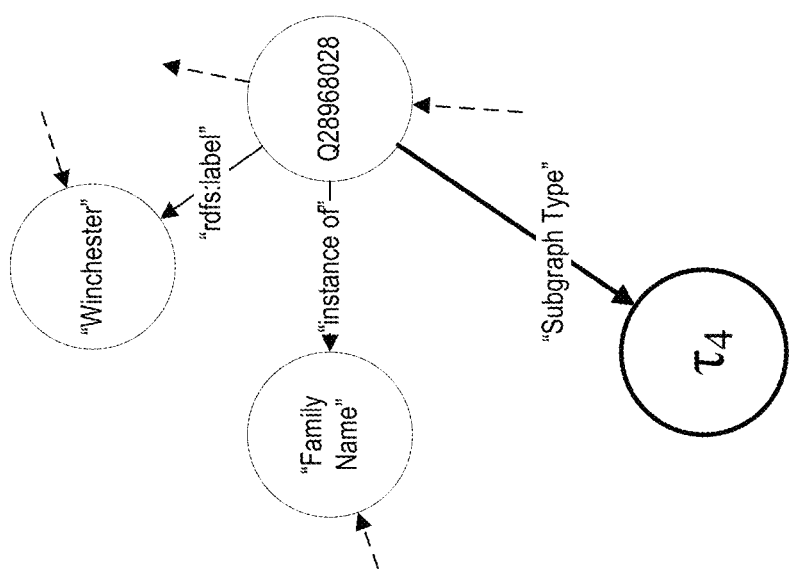
Figure 4B:
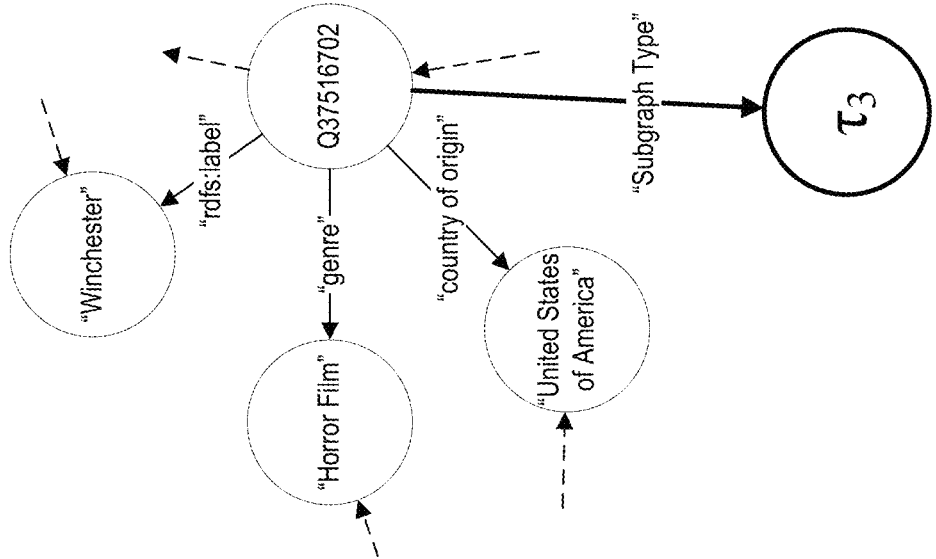

In some implementations, assigned subgraph types can be stored directly in the knowledge graph by adding a new node for each identified subgraph type and edges coupling to the new subgraph type node each node that has been assigned that subgraph type. For example, in FIG. 4A, a new subgraph type node $\tau_1$ has been added to the knowledge graph (where $\tau_1 = \tau_{(country,\ capital\ of,\ \ldots)}$). Because Node Q8684 and Node Q172157 have both been assigned this same subgraph type, Node Q8684 and Node Q172157 are each coupled to the subgraph node $\tau_1$ by an edge labelled "subgraph type." Similarly, FIG. 4B illustrates another portion of the first knowledge graph where two other subgraph nodes have been added ($\tau_3 = \tau_{(genre,\ country\ of\ origin,\ \ldots)}$ and $\tau_4 = \tau_{(instance\ of,\ rdfs:label,\ \ldots)}$). Nodes Q37516702 and Node Q28968028 have each been coupled to the respectively assigned subgraph type nodes by an edge labeled "Subgraph Type." Appropriate subgraph type nodes are also similarly added to the second knowledge graph.

Figure 5A:
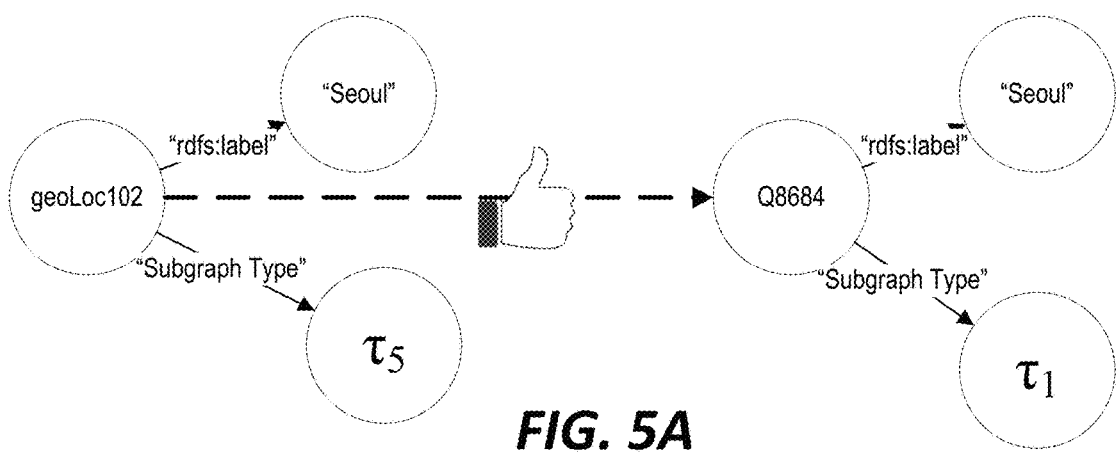
FIGS. 5A and 5B are schematic diagrams illustrating a mechanism for aligning entities from the first knowledge graph and the second knowledge graph based in part on the assigned subgraph type.
Figure 5B:
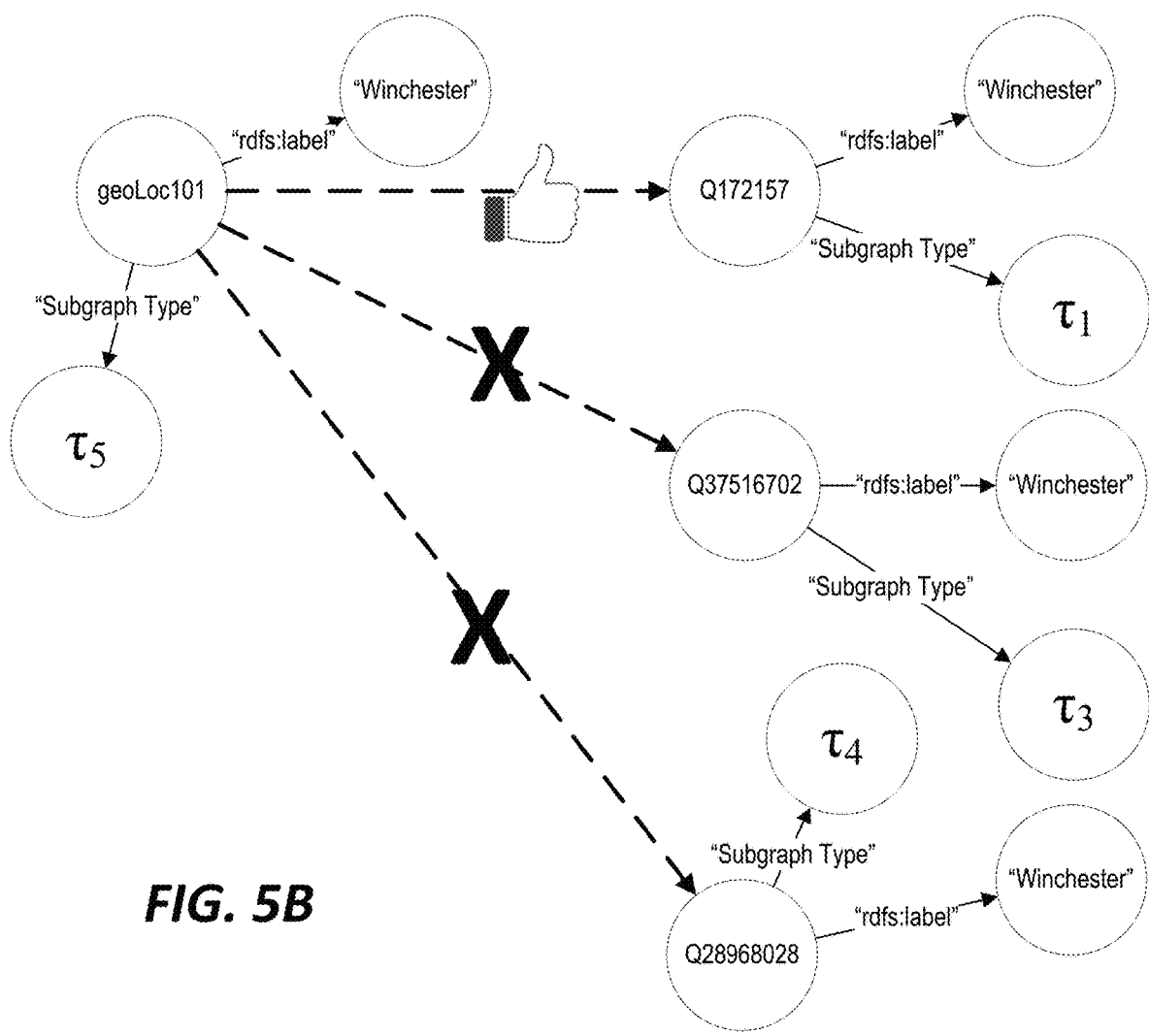

In some implementations, the process of aligning the two knowledge graphs after subgraph type labels have been assigned begins with applying a string-matching algorithm over the labels of each node. In other implementations, other matching techniques may be used in addition to or instead of string-matching. For example, as illustrated in FIG. 5A, by applying the string-matching to the first and second knowledge graphs, Node Q8684 in the first knowledge graph and Node geoLoc102 in the second knowledge graph are matched because these are the only node in each knowledge graph that share the label "Seoul." As illustrated in FIG. 5B, the same string-matching technique would "match" Node geoLoc101 from the second knowledge graph with three different nodes from the first knowledge graph (i.e., Node Q172157, Node Q37516702, and Node Q28968028) because all four of these nodes are labeled with the same string "Winchester." However, for proper alignment purposes, only one of the nodes from the first knowledge graph is actually a "match" with Node geoLoc101 from the second knowledge graph. The assigned subgraph typing can now be used to identify which of the three detected "candidate" matches is the actual match.

As illustrated in FIG. 5A and in the discussion above, Node geoLoc102 has been matched with Node Q8684 using a string-matching technique. Because no other candidate matches have been identified, we can assume that the match of Node geoLoc102 and Node Q8684 is a correct mapping. By extension, we can also assume that subgraph type $\tau_5$ (i.e., the subgraph type assigned to Node geoLoc102) corresponds to subgraph type $\tau_1$ (i.e., the subgraph type assigned to Node Q8684). Returning to the example of FIG. 5B, because Node geoLoc101 has also been assigned subgraph type $\tau_5$, we can assume that the correct matching node from the first knowledge graph is the candidate match that has been assigned subgraph type $\tau_1$. As a result, Node Q172157 is identified as the node in the first knowledge graph that matches Node geoLoc101 in the second knowledge graph because (1) both nodes share the label "Winchester" and (2) subgraph type $\tau_1$ and subgraph type $\tau_5$ have been identified as corresponding subgraph types.

The example of FIGS. 5A & 5B and the other examples describes herein below are relatively simplified examples. In other implementations and situations, mappings made by alignment processing may be represented as probabilities instead of direct one-to-one mappings. Furthermore, although the example subgraph typing and alignment discussed above use labels of nearby edges to define a subgraph type, other subgraph type labelling conventions may be used in addition to or instead of the combination of edge labels within one hop of the node in question. For example, in various different implementations, subgraph types may be defined as "edge-set" types, "node-set" types, and/or "node-edge-set types." Edge-set typing is the technique described above in reference to the example of FIGS. 5A and 5B in which the subgraph type is defined by the labels of outgoing edges coupled to the target node. Node-set typing is a technique in which a subgraph type is defined by the labels of the nodes to which the target node is coupled (i.e., the set of nodes linked via outgoing edges from the target node). Node-Edge-Set typing is a combination of Edge-Set typing and Node-Set typing in which a subgraph type is defined by the labels of both the outgoing edges from the target nodes and the nodes to which the target node is coupled.

Additionally, although the example described above defines a subgraph type based on edge labels that are within one hop of the target node (e.g., outgoing edges extending directly from the target node), in other implementations, more complex subgraph types may be defined and considered by using "multi-hop" types. For example, instead of defining the subgraph type of Node Q8684 in FIG. 2A based only on the outgoing edge labels extending directly from Node Q8684, the subgraph type might be further defined based on the labeled of the outgoing edges extending from the set of nodes that are directly coupled to Node Q8684 (i.e., the outgoing edges extending from the "City" node, the "Seoul" node, and the "South Korea" node).

In some implementations, subgraph typing may be further extended to utilize probability set types by assigning subgraph types with frequently used nodes and/or edges and/or by assigning subgraph types with edges connected to "popular" nodes (e.g., nodes with more than a threshold number of edges). In some implementations, computer systems may be configured to mine such frequencies and popularities to be used later.

Also, while only outgoing edges are considered in some of the examples described herein, in some implementations, subgraph types may be assigned based on incoming edges in addition to or instead of outgoing edges.

Figure 6:
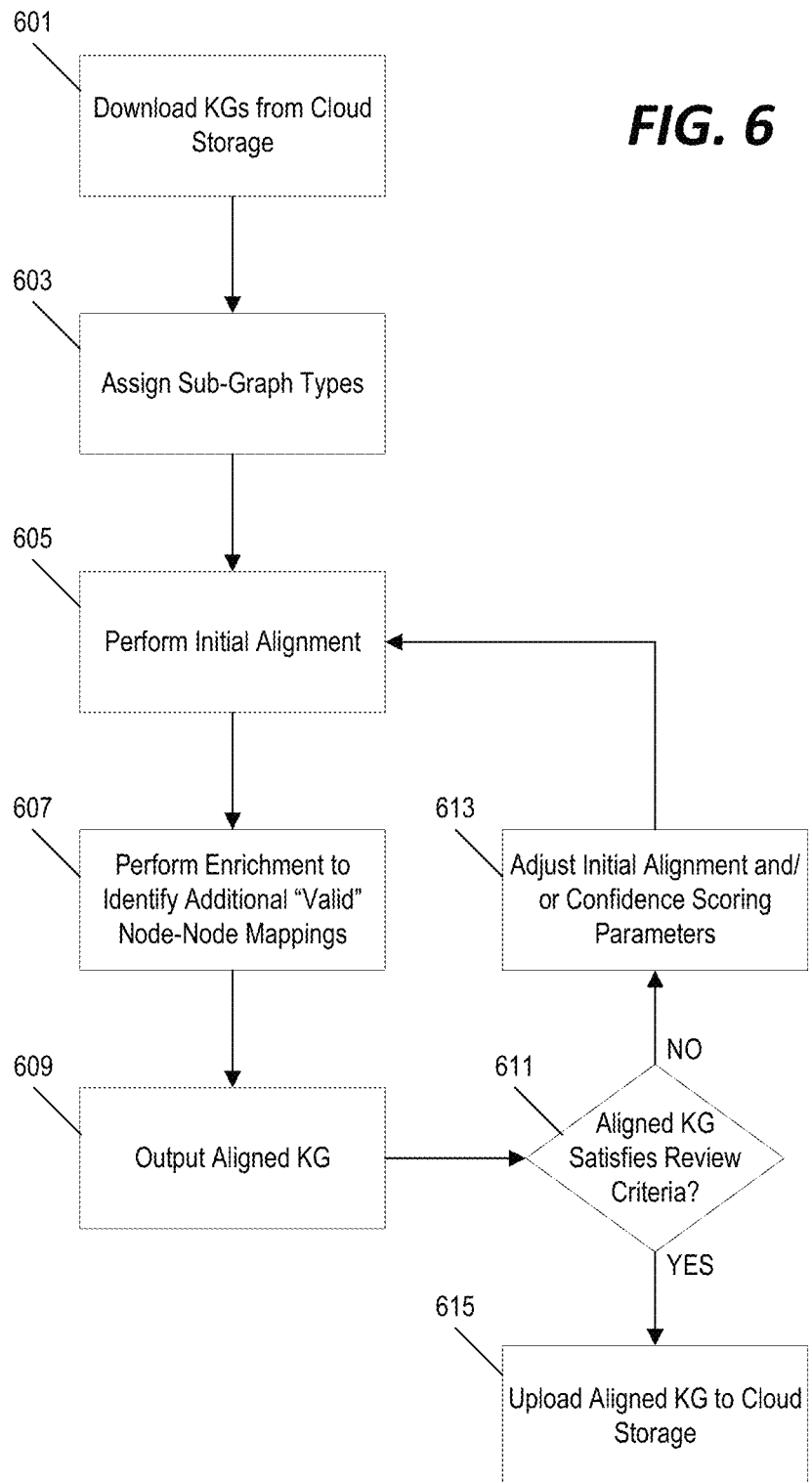
FIG. 6 is a flowchart of a method of aligning multiple knowledge graphs using the subgraph typing mechanism using the system of FIG. 1.

FIG. 6 illustrates an example of a method performed by a computer system (e.g., the system of FIG. 1) to align multiple knowledge graphs using the subgraph typing as described above. First, knowledge graphs are downloaded from cloud storage (step 601). For example, in some implementations, publicly available source knowledge graphs are retrieved from storage repositories and stored to local memory storage of the computer system that is performing the alignment. In other implementations, one or more of the knowledge graphs may be a private knowledge graph stored locally or in a private network storage.

After the knowledge graphs that are to be aligned are retrieved, each knowledge graph is processed to identify and assign subgraph types to each node (step 603). In some implementations, the computer system is configured to traverse the source knowledge graphs using a traversal algorithm to "visit" each node in the source knowledge graph and to assign a subgraph type to each node. When a new subgraph type is determined for a node, the system creates a new node and a new edge linking between the original node and the new subgraph type node (as described above in reference to FIGS. 5A and 5B). In some implementations, the computer system is also configured to create a "node-type index" that lists each node in the knowledge graphs and the subgraph type assigned to that node (such as illustrated, for example, in FIG. 9B below). The computer system may also be configured to co-label subgraph type information and additional meta-information including, for example, timestamps that record when a new subgraph type node is generated and/or when a subgraph type is assigned to a particular node.

The computer system then performs an initial alignment of the knowledge graphs (step 605), for example, by applying a string-matching algorithm to identify potentially matching nodes from different knowledge graphs. For some nodes in a knowledge graph, this initial alignment may identify only a single "candidate" matching node from the other knowledge graph. However, for other nodes, the initial alignment may identify multiple different "candidate" matching nodes from the other knowledge graph. Accordingly, the computer system is configured to then perform an enrichment step to identify which "candidate" matches are "valid" matches (step 607). As described above and again in further detail below, "valid" matches can be identified, for example, based on: (1) a number of candidate matches for a particular target node and (2) the combination of subgraph types assigned to the candidate matching pair.

Once the alignment and enrichment steps are completed, the aligned knowledge graphs are output (step 609) and, in some implementations, the computer system is configured to review the mapping results to evaluate whether the nodes and their types are mapped properly. In some implementations, the mapping may be reviewed against a defined review criteria metric. For example, the computer system may be configured to receive a relatively small sub-set of manually selected "matching" pairs of nodes and to review the mapping results of the automated alignment procedure by determining how many of the "manually" selected matching pairs were also identified as matching pairs by the automated alignment & enrichment process based on subgraph typing. If the aligned knowledge graphs do not satisfy the review criteria (step 611), the alignment and enrichment procedure is repeated (e.g., with an adjustment to the parameters of the initial alignment step and/or adjustments to the confidence scoring parameters used to determine whether a matched pair is a "valid" match (as described in further detail below)) (step 613). Once an aligned knowledge graph is produced that satisfies the review criteria (step 611), the aligned knowledge graphs are uploaded to cloud storage for use (step 615).

Figure 7:
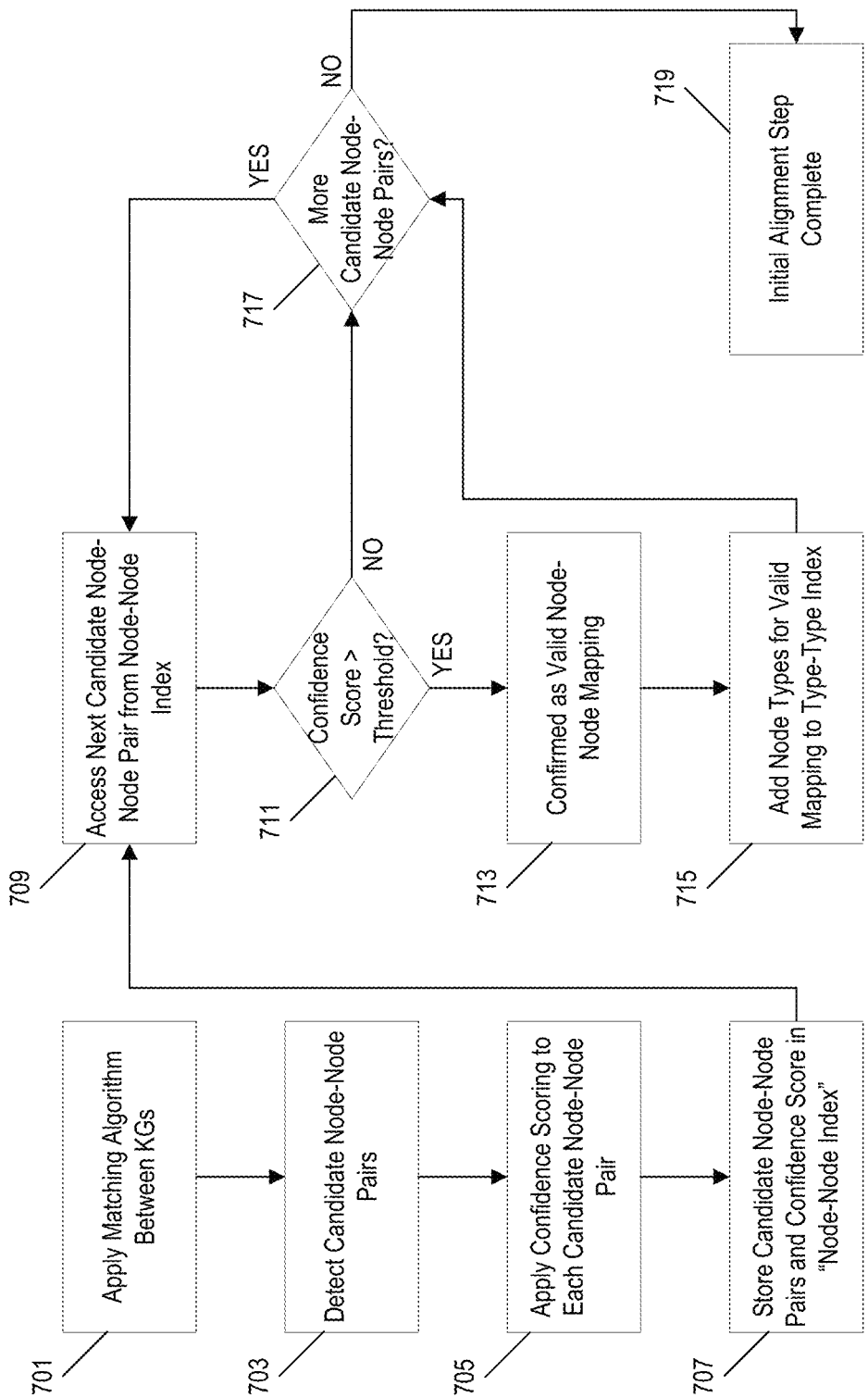
FIG. 7 is a flowchart of a method for performing the initial alignment of the knowledge graphs in the method of FIG. 6.

FIG. 7 illustrates an example of a method for performing the initial alignment step (e.g. step 605 of FIG. 6) while also assigning "confidence score" to each candidate matching pair. These confidence scores will then be used to determine whether a candidate matching pair is a "valid" mapping. In the example of FIG. 7, a matching algorithm is applied between two or more knowledge graphs (step 701). This matching algorithm may include, for example, a string matching algorithm applied to the labels of one or more nodes coupled to the target node (as discussed above). Based on the output of the matching algorithm, the computer system detects candidate node-node pairs (step 703) (i.e., nodes from different knowledge graphs that are determined as "matching" by the matching algorithm).

The computer system then applies an initial confidence scoring to each identified candidate node-node pair (step 705). In some implementations, the computer system is configured to calculate a confidence score for each candidate node-node pair based on factors including, for example, a similarity matching metric (e.g., how similar was the string data that was used to identify the candidate node-node pair as "matching"?) and a number of other candidate node-node pairs that includes either node. For example, in some implementations, confidences scores are computed on a scale of 0.0 to 1.0 (with 1.0 indicating the highest available confidence score). In such implementations, a candidate node-node pair might be assigned a perfect confidence score of 1.0 when the text labels of the nodes match exactly and neither node is matched in any other candidate node-node pair (i.e., a one-to-one match). In contrast, the confidence score is reduced based on variations between the text labels and/or for each additional candidate node-node pair that includes either of the two nodes.

The computer system then stores each candidate node-node pair and the corresponding confidence score in a node-node index (step 707). One example of a node-node index is illustrated in FIG. 9A and is discussed in further detail below. Once all candidate node-node pairs are identified and included in the node-node index with an assigned confidence score, the computer system begins to evaluate each candidate node-node pair to determine which candidate node-node pair can be confirmed as "valid" pairs. In the example of FIG. 7, a candidate node-node pair is accessed from the node-node index (step 709) and the computer system determines whether the confidence score for the accessed candidate node-node pair is greater than a threshold (step 711). If the confidence score exceeds the threshold, the candidate node-node pair is confirmed as a valid node-node mapping (step 713) and the subgraph type for each node in the candidate node-node pair (e.g., the subgraph type combination) are added to a type-type index (step 715). One example of a type-type index is illustrated in FIG. 9C and discussed in further detail below. This process is repeated until each candidate node-node pair has been considered (step 717) and then the initial alignment step is complete (step 719). After the initial alignment, the node-node index includes a listing of all candidate node-node pairs & a confidence score assigned to each candidate node-node pair and the type-type index includes a listing of subgraph type pairs for each node-node mapping that has been confirmed as valid during the initial alignment step.

Figure 8:
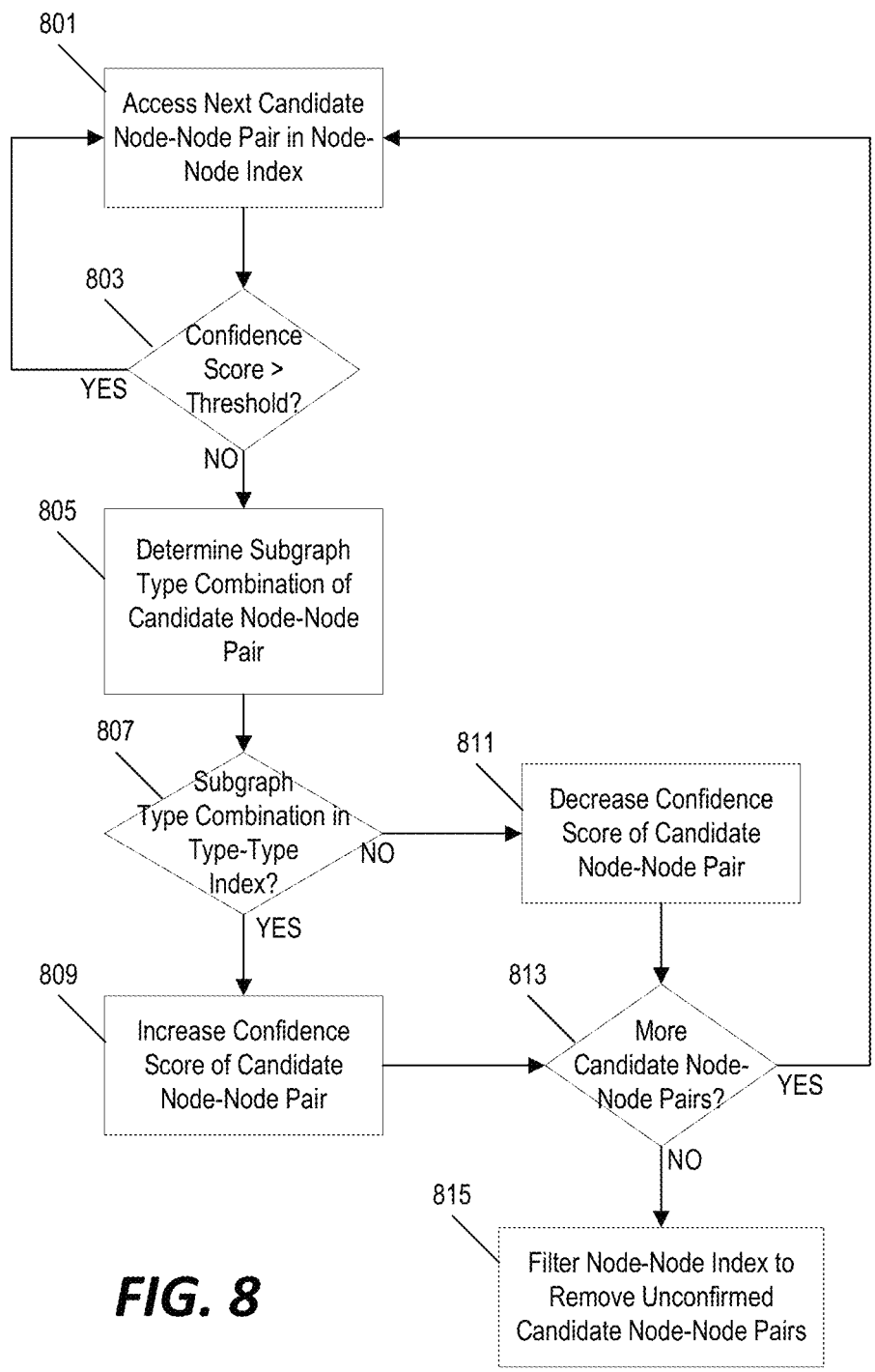
FIG. 8 is a flowchart of a method for performing knowledge graph enrichment based on subgraph type in the method of FIG. 6.

FIG. 8 illustrates an example of a method for performing the enrichment step to identify other valid node-node mapping based on the assigned subgraph types after completing the initial alignment step of FIG. 7. During the enrichment step, the computer system again iteratively accesses each candidate node-node pair in the node-node index (step 801). If the confidence score for the node-node pair exceeds the threshold (step 803), then the candidate node-node pair has already been confirmed as valid and the computer system proceeds to the next candidate node-node-pair in the node-node index. However, if the confidence score is below the threshold, the computer system determines the subgraph type combination for the candidate node-node pair (i.e., the subgraph type assigned to each node in the candidate node-node pair) (step 805). As discussed above in reference to FIG. 7, a subgraph type combination is added to the type-type index if a candidate node-node pair includes nodes of that subgraph type combination has already been confirmed as a valid pairing. Accordingly, at step 807 in the method of FIG. 8, a type-type index includes a listing of subgraph type combinations that have also already been confirmed as valid pairings. If the subgraph type combination for the candidate node-node pair is already included in the type-type index (step 807), that means that a confirmed valid node-node mapping has been identified with the same subgraph type combination as the candidate node-node pair. Therefore, the confidence score of the candidate node-node pair is increased (step 809) if the subgraph type combination for the candidate node-node pair is already included in the type-type index. Conversely, the confidence score of the candidate node-node pair is decrease (step 811) if the subgraph type combination for the candidate node-node pair is not already included in the type-type index. This process is repeated for each candidate node-node pair in the node-node index until all of the candidate node-node pairs have been evaluated against the type-type index (step 813). In some implementations, after all candidate node-node pairs have been evaluated in the enrichment step, the node-node index is filtered to remove any remaining unconfirmed candidate node-node pairs (e.g., any candidate node-node pairs with a confidence score below the threshold) (step 815).

To further illustrate the operation of the alignment and enrichment method described in FIGS. 6 through 8, FIGS. 9A through 11C illustrate an example of a node-node index, a node-type index, and a type-type index at various different stage of the alignment and enrichment method applied to the first knowledge graph of FIGS. 2A through 2D and the second knowledge graph of FIGS. 3A through 3B. FIGS. 9A, 9B, and 9C illustrate the node-node index, the node-type index, and the type-type index, respectively, after completion of the initial alignment method of FIG. 7. FIGS. 10A, 10B, and 10C illustrate the node-node index, the node-type index, and the type-type index, respectively, after completion of the confidence score adjustments in the enrichment method of FIG. 8, but before applying the filter to remove unconfirmed candidate node-node pairs from the node-node index (i.e., before step 815). FIGS. 11A, 11B, and 11C illustrate the node-node index, the node-type index, and the type-type index, respectively, after completion of the alignment method of FIG. 6.

As described above in reference to FIG. 6, the method begins by assigning subgraph types to each node in each knowledge graph (e.g., step 603 of FIG. 6). Accordingly, the node-type index of FIG. 9B includes an entry for each node in the subgraph examples of FIGS. 2A through 3B and the assigned subgraph type for each node.

As described above in reference to FIG. 7, the initial alignment process identifies candidate node-node pairs (e.g., step 703) and assigns a computed confidence score to each candidate node-node pair (e.g., step 705). Accordingly, the node-node index of FIG. 9A includes all possible candidate node-node pairs. In the node-node index of FIG. 9A, Node geoLoc102 is matched with Node Q8684 while Node geoLoc101 is matched with Node Q172157, Node Q3751602, and Node Q28968028. The candidate node-node pair of Node geoLoc102 and Node Q8684 is assigned a confidence score of 1.0 because the labels "Seoul" in each subgraph is an identical match and neither node in this candidate node-node pair is matched with any other node in another candidate node-node pair. However, while the other nodes all include an identical match of the label "Winchester," the confidence score for each of the other three candidate node-node pairs is only 0.5 because Node geoLoc101 has been matched with three different nodes from the other knowledge graph.

As described above in reference to FIG. 7, each a candidate node-node pair in the node-node index with a confidence score that is greater than a threshold is confirmed as a valid node-node mapping (e.g., step 713) and the subgraph type combination of that confirmed node-node mapping is added to the type-type index (step 715). For this example, the threshold is set as 0.8 and, in the node-node index of FIG. 9A, only the first candidate node-node pair (i.e., Node geoLoc102 and Node Q8684) has a confidence score that exceeds this threshold. Therefore, the type-type index of FIG. 9C is updated to include the combination of subgraph types assigned to the nodes in the confirmed node-node mapping. In the example of FIG. 9C, the type-type index is also updated to include a "statistics" column that stores other information regarding the type-type combinations including, for example, a number of confirmed valid node-node mappings that have been identified as including each subgraph type combination. In the example of FIG. 9C, only a single candidate node-node pair with the subgraph type combination listing in the type-type index has been confirmed as a valid mapping and, therefore, the "count" for the subgraph type combination is "1".

As described above, during the enrichment process of FIG. 8, the computer system will consider each candidate node-node pair in the node-node index to determine whether the subgraph type combination of the candidate node-node pair is included in the type-type index and will adjust the confidence score for the candidate node-node pair accordingly. In the example, node-node index of FIG. 10A, the first candidate node-node pair (Node geoLoc102 and Node Q8684) has already been confirmed as a valid node-node mapping and, therefore, the assigned confidence score is not adjusted further.

For the second candidate node-node pair in the node-node index of FIG. 10A (Node geoLoc101 and Node Q172157), the computer system determines that the subgraph type combination of the candidate node-node pair matches a subgraph type combination that is already included in the type-type index. Therefore, the confidence score for the second candidate node-node pair in the node-node index is increased from 0.5 to 0.9. Furthermore, because the confidence score for the second candidate node-node pair now exceeds the threshold of 0.8, the second candidate node-node pair is confirmed as a valid node-node pair and the "count" for the subgraph type combination in the type-type index is incremented to indicate that a second node-node mapping with the same subgraph type combination has been confirmed as valid.

However, the computer system determines that the subgraph type combinations for the third and fourth candidate node-node pairs in the node-node index of FIG. 10A do not match any of the subgraph type combinations in the type-type index. Therefore, the confidence score for the third and fourth candidate node-node pairs are each reduced from 0.5 to 0.1.

After analyzing each candidate node-node pair in the node-node index based on its subgraph type combination and adjusting the confidence score accordingly, the computer system applies a filter to the node-node index to remove all candidate node-node pairs that have a confidence score below the threshold. In the example of FIG. 10A, the first and the second candidate node-node pairs each have a confidence score that exceeds the threshold of 0.8. However, the third and fourth candidate node-node pairs each have a confidence score below the threshold of 0.8. Accordingly, in the node-node index of FIG. 11A, the third and fourth candidate node-node pairs have been removed and only the confirmed valid node-node mappings of the first and second candidate node-node pairs remain in the node-node index of FIG. 11A.

The examples described above are only a few possible implementations of the subgraph typing-based mechanism for aligning knowledge graphs. Variations are possible in other implementations. For example, while the example above applies a filter to remove any candidate node-node pairs that have not been confirmed as valid node-node mappings, in some implementations, unconfirmed candidate node-node pairs are left in the node-node index and no such filtering is applied.

Additionally, in the examples above, each node-node pair has a single defined type-type pair and enrichment is performed by checking the type-type index for that exact same type-type pair. However, in some implementations, the computer system may be further configured to identity a type-type pair from the type-type index that most closely matches the subgraph type combination of the candidate type-type pair and then determines whether the candidate node-node pair is a valid mapping in part based on how closely the subgraph type combination of the candidate node-node pair matches the type-type pair from the type-type index. In some implementations, the computer system uses a set-similarity metric (e.g., a Jaccard index, the Sorensen-Dice coefficient, the overlap coefficient, or the Tversky index) to quantify similarity between the subgraph type combination of the candidate node-node pair and one or more of the subgraph type combinations included in the type-type index.

For example, a candidate node-node pair may include the subgraph types ($\tau_{(a,b,c)}$, $\tau_{(d,e,f)}$) and, although this exact subgraph type combination is not included in the type-type index, the type-type index does include similar subgraph type combinations ($\tau_{(a,b,c)}$, $\tau_{(d,e,f,g)}$) and ($\tau_{(a,b,x)}$, $\tau_{(d,e,f)}$). In that case, the computer system may compute a set-similarity metric by comparing sets including the edge labels for each subgraph type combination. The computer system may then calculate an updated confidence score for the candidate node-node pair based in part on the calculated set similarity metric. However, the magnitude of the change in the confidence score will be lower for subgraph type combinations that only partially match a subgraph type combination in the type-type index. For example, in FIG. 10A, the confidence score of the second candidate node-node combination was increased from 0.5 to 0.9 because the subgraph type combination of the second candidate node-node combination matched exactly with the subgraph type combination in the type-type index. However, if a subgraph type combination for a candidate node-node combination only partially matches a subgraph type combination in the type-type index, the confidence score might instead be increased from 0.5 to only 0.8 (or 0.7 if the set-similarity metric is relatively low). In this way, the computer system can be configured to assign higher scores as the subgraph type combination of the candidate node-node pair are more closely matches to ones in the type-type index.

Additionally, in the examples described above, the confidence score is generally assigned and adjusted incrementally based on a detected condition (e.g., a score of 1.0 is assigned for an exact one-to-one match while a score of 0.5 is assigned when a node matches exactly to multiple different nodes). However, in some implementations, the confidence score is calculated using an algorithm and/or equation based, for example, on set-similarity metrics from the string-matching and/or from the subgraph type combination matching.

As described above in reference to FIG. 8, the computer system may be configured to increase the confidence score of a candidate node-node pair in response to determining that the subgraph type combination for the candidate node-node pair matches a subgraph type combination that is already included in the type-type index. As also described above, the type-type index may be configured to store a metric indicating the number of confirmed valid node-node mappings that have the same subgraph type combination. In some implementations, the computer system may be configured to determine an adjustment of the confidence score based on the "count" of the subgraph type combination to which the candidate node-node pair is matched. When the subgraph type combination of a candidate node-node pair matches a subgraph type combination with a higher "count" statistic, the confidence score for the candidate node-node pair would be increased by a greater amount. In contrast, when the subgraph type combination of a candidate node-node pair matches a subgraph type combination with a lower "count" statistic, the confidence score for the candidate node-node pair would be increased by a lesser amount. For example, if the subgraph type combination has a "count" of 1000, the confidence score for the candidate node-node pair might be increased from 0.5 to 0.9 and, if the subgraph type combination has a "count" of only 10, the confidence score for the candidate node-node pair might instead be increased only from 0.5 to 0.6.

Accordingly, the invention provides, among other things, a computer-based system and methods for aligning knowledge graphs by assigning subgraph types. Various features and advantages of the invention are set forth in the following claims.

What is claimed is:

1. A computer-based method for aligning knowledge graphs, the method comprising:
   assigning, by an electronic controller, a subgraph type to each node of a plurality of nodes in a first knowledge graph and a second knowledge graph, wherein the first knowledge graph and the second knowledge graph each include a plurality of nodes each coupled to one or more other nodes by a plurality of edges, wherein the assigned subgraph type to a node is defined by at least one selected from a group consisting of a set of labels of one or more edges extending from the node and a set of labels of other nodes to which the node is coupled;
   performing, by the electronic controller, an initial matching to the first knowledge graph and the second knowledge graph to identify a plurality of candidate node-node pairs, wherein each candidate node-node pair of the plurality of candidate node-node pairs includes a node from the first knowledge graph and a node from the second knowledge graph;
   identifying a first candidate node-node pair as a first valid node-node mapping;
   identifying a second candidate node-node pair as a second valid node-node mapping based at least in part on a determination that a subgraph type combination of the second candidate node-node pair matches a subgraph type combination of the first candidate node-node pair, wherein the subgraph type combination of the first candidate node-node pair includes the subgraph type assigned to the node from the first knowledge graph and the subgraph type assigned to the node from the second knowledge graph in the candidate node-node pair;
   connecting the first knowledge graph and the second knowledge graph by adding a new subgraph type node associated with the subgraph type and adding a plurality of new edges coupling the new subgraph type node to a first node assigned the subgraph type in the first knowledge graph and to a second node assigned the subgraph type in the second knowledge graph;
   receiving a natural language inquiry via a user input;
   generating a natural language output based on the natural language input and the new subgraph type node; and,
   outputting the natural language output via a display screen or a speaker.

2. The method of claim 1, wherein assigning the subgraph type to each node of the plurality of nodes includes:
   identifying, for each node of the plurality nodes, the labels of each edge extending directly from the node; and
   defining the subgraph type of the node as a set including the labels of each edge extending directly from the node.

3. The method of claim 1, wherein assigning the subgraph type to each node of the plurality of nodes includes:
   identifying, for each node of the plurality of nodes, the labels of each other node that is coupled to the node within a distance of one edge from the node; and
   defining the subgraph type of the node as a set including the labels of each other node that is coupled to the node within the distance of one edge from the node.

4. The method of claim 1, wherein performing the initial matching includes:
   identifying a label associated with a target node in the first knowledge graph;
   applying a string matching to identify all nodes in the second knowledge graph with a label matching the label associated with the target node; and
   identifying the target node in the first knowledge graph and each identified node in the second knowledge graph each as a separate candidate node-node pair.

5. The method of claim 4, wherein identifying the first candidate node-node pair as the first valid node-node mapping includes:
   assigning a confidence score to each candidate node-node pair of the plurality of candidate node-node pairs, wherein the assigned confidence score is based at least in part on a number of other nodes from the second knowledge graph to which the target node is matched by the string matching; and
   identifying the first candidate node-node pair as the first valid node-node mapping in response to determining that the confidence score assigned to the first candidate node-node pair exceeds a threshold.

6. The method of claim 5, wherein assigning the confidence score to each candidate node-node pair includes assigning a confidence score value that exceeds the threshold in response to determining that the target node from the first knowledge graph is matched with only one node from the second knowledge graph.

7. The method of claim 5, wherein assigning the confidence score to each candidate node-node pair includes assigning the confidence score based at least in part on a degree of similarity between the labels of the nodes in the candidate node-node pair.

8. The method of claim 5, wherein identifying a second candidate node-node pair as a second valid node-node mapping includes assigning an initial confidence score to the second node-node pair after performing the initial matching, wherein the initial confidence score does not exceed the threshold;
   assigning an adjusted confidence score to the second node-node pair in response to determining that the subgraph type combination of the second candidate node-node pair matches the subgraph type combination of the first candidate node-node pair, wherein assigning the adjusted confidence score includes increasing the initial confidence score; and
   identifying the second candidate node-node pair as the second valid node-node mapping in response to determining that the adjusted confidence score assigned to the second node-node pair exceeds the threshold.

9. The method of claim 5, further comprising:
   maintaining a type-type index including a listing of subgraph type combinations for each candidate node-node pair of the plurality of candidate node-node pairs that has been identified as a valid node-node mapping;
   increasing the confidence score assigned to a third candidate node-node pair in response to determining that a subgraph type combination of the third candidate node-node pair is included in the type-type index; and
   decreasing the confidence score assigned to a fourth candidate node-node pair in response to determining that a subgraph type combination of the fourth candidate node-node pair is not included in the type-type index.

10. The method of claim 1, further comprising:
    maintaining a type-type index including a listing of subgraph type combinations for each candidate node-node pair of the plurality of candidate node-node pairs that has been identified as a valid node-node mapping; and
    identifying a third candidate node-node pair as not a valid node-node mapping based at least in part on a determination that a subgraph type combination of the third candidate node-node pair is not included in the type-type index,
    wherein identifying the second candidate node-node pair as the second valid node-node mapping includes identifying the second candidate node-node pair as the second valid node-node mapping based at least in part on a determination that the subgraph type combination of the second candidate node-node pair is included in the type-type index.

11. The method of claim 4, further comprising
    assigning a confidence score to each candidate node-node pair of the plurality of candidate node-node pairs, wherein the assigned confidence score is determined based at least in part on a degree of similarity between the nodes, and wherein the confidence score is indicative of a probability that the candidate node-node pair is a valid node-node mapping; and
    adjusting the confidence score of a candidate node-node pair based at least in part on a degree of similarity between the subgraph type combination of the candidate node-node pair and a subgraph type combination of another candidate node-node pair that has been identified as a valid node-node mapping.

12. The method of claim 11, further comprising:
    identifying a plurality of valid node-node mappings, wherein each valid node-node mapping identifies a node from the first knowledge graph and a node from the second knowledge graph that both represent a same real-world entity; and
    producing as output an aligned knowledge graph based on the plurality of valid node-node mappings, a number of other nodes from the second knowledge graph to which the target node is matched by the string matching; and
    identifying the first candidate node-node pair as the first valid node-node mapping in response to determining that the confidence score assigned to the first candidate node-node pair exceeds a threshold.

13. The method of claim 1, wherein each node of the plurality of nodes in the first knowledge graph and the second knowledge graph represents a real-world entity, wherein each other node to which the node is coupled represents a descriptive feature of the real-world entity, and wherein each edge includes a directional labeled edge identifying the type of descriptive feature of the other node coupled to the node by the directional labeled edge.

14. The method of claim 13, wherein the real-world entity represented by each node of the plurality of nodes in the first knowledge graph and the second knowledge graph includes at least one selected from a group consisting of a city, a location, a country, a movie, and a family name.

15. A method of training a machine-learning model, the method comprising:
    aligning at least two knowledge graphs by
       assigning, by an electronic controller, a subgraph type to each node of a plurality of nodes in a first knowledge graph and a second knowledge graph, wherein the first knowledge graph and the second knowledge graph each include a plurality of nodes each coupled to one or more other nodes by a plurality of edges, wherein the assigned subgraph type to a node is defined by at least one selected from a group consisting of a set of labels of one or more edges extending from the node and a set of labels of other nodes to which the node is coupled;
       performing, by the electronic controller, an initial matching to the first knowledge graph and the second knowledge graph to identify a plurality of candidate node-node pairs, wherein each candidate node-node pair of the plurality of candidate node-node pairs includes a node from the first knowledge graph and a node from the second knowledge graph;
       identifying a first candidate node-node pair as a first valid node-node mapping;
       identifying a second candidate node-node pair as a second valid node-node mapping based at least in part on a determination that a subgraph type combination of the second candidate node-node pair matches a subgraph type combination of the first candidate node-node pair, wherein the subgraph type combination of the first candidate node-node pair includes the subgraph type assigned to the node from the first knowledge graph and the subgraph type assigned to the node from the second knowledge graph in the candidate node-node pair; and
       connecting the first knowledge graph and the second knowledge graph by adding a new subgraph type node associated with the subgraph type and adding a plurality of new edges coupling the new subgraph type node to a first node assigned the subgraph type in the first knowledge graph and to a second node assigned the subgraph type in the second knowledge graph;
    training the machine-learning model based on the aligned knowledge graphs and the new subgraph type node,
    receiving a natural language inquiry via a user input;
    generating a natural language output based on the natural language input and the machine-learning model; and, outputting the natural language output via a display screen or a speaker.

16. The method of claim 15, wherein training the machine-learning model to use the aligned knowledge graphs includes training the machine-learning model to receive as input a natural language inquiry and to produce as output a natural language response, wherein the natural language response is determined using the aligned knowledge graphs.

17. A system for natural language inquiry processing, the system including:
an input device;
an output device; and
a controller configured to
receive a natural language inquiry through the input device,
provide the natural language inquiry as input to a machine-learning model trained by aligning at least two knowledge graphs by
assigning, by an electronic controller, a subgraph type to each node of a plurality of nodes in a first knowledge graph and a second knowledge graph, wherein the first knowledge graph and the second knowledge graph each include a plurality of nodes each coupled to one or more other nodes by a plurality of edges, wherein the assigned subgraph type to a node is defined by at least one selected from a group consisting of a set of labels of one or more edges extending from the node and a set of labels of other nodes to which the node is coupled;
performing, by the electronic controller, an initial matching to the first knowledge graph and the second knowledge graph to identify a plurality of candidate node-node pairs, wherein each candidate node-node pair of the plurality of candidate node-node pairs includes a node from the first knowledge graph and a node from the second knowledge graph;
identifying a first candidate node-node pair as a first valid node-node mapping;
identifying a second candidate node-node pair as a second valid node-node mapping based at least in part on a determination that a subgraph type combination of the second candidate node-node pair matches a subgraph type combination of the first candidate node-node pair, wherein the subgraph type combination of the first candidate node-node pair includes the subgraph type assigned to the node from the first knowledge graph and the subgraph type assigned to the node from the second knowledge graph in the candidate node-node pair; and
connecting the first knowledge graph and the second knowledge graph by adding a new subgraph type node associated with the subgraph type and adding a plurality of new edges coupling the new subgraph type node to a first node assigned the subgraph type in the first knowledge graph and to a second node assigned the subgraph type in the second knowledge graph; and
train the machine-learning model based on the aligned knowledge graphs including the new subgraph type node, and
generate an output through the output device, wherein the output includes a response to the natural language inquiry and is generated based on the machine-learning model,
wherein the output device is a display screen or speaker.

18. The system of claim 17, wherein the input device includes at least one selected from a group consisting of a microphone and a keyboard.

* * * * *